United States Patent
Ahmed et al.

(10) Patent No.: US 8,352,461 B2
(45) Date of Patent: Jan. 8, 2013

(54) TABLE ELIMINATION OPTIMIZATIONS

(75) Inventors: Rafi Ahmed, Fremont, CA (US);
Thierry Cruanes, Foster City, CA (US);
Sridhar Sarnobat, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 11/854,526

(22) Filed: Sep. 12, 2007

(65) Prior Publication Data

US 2009/0070315 A1     Mar. 12, 2009

(51) Int. Cl.
*G06F 7/00*     (2006.01)
(52) U.S. Cl. ........................ 707/714; 707/759
(58) Field of Classification Search .................. 707/714, 707/759, 999.004
See application file for complete search history.

(56) References Cited

U.S. PATENT DOCUMENTS

| | | | |
|---|---|---|---|
| 5,724,570 A | 3/1998 | Zeller et al. | |
| 6,339,768 B1 | 1/2002 | Leung et al. | |
| 6,341,281 B1 | 1/2002 | MacNicol et al. | |
| 6,449,609 B1 * | 9/2002 | Witkowski | 1/1 |
| 6,560,594 B2 | 5/2003 | Chochrane et al. | |
| 8,145,627 B2 | 3/2012 | Al-Omari | |
| 2002/0147714 A1 * | 10/2002 | Koo et al. | 707/3 |
| 2003/0078922 A1 | 4/2003 | Pham et al. | |
| 2003/0167258 A1 | 9/2003 | Koo et al. | |
| 2006/0200451 A1 | 9/2006 | Kosuru et al. | |

OTHER PUBLICATIONS

Bello, Materialized Views in Oracle, Sigmod, 1998.*
Li, C. et al., "Minimizing View Sets without Losing Query-Answering Power" 2001, Springer, pp. 99-113.
Mumick, I. et al., "Maintenance of Data Cubes and Summary Tables in a Warehouse", ACM 1997, pp. 100-111.
Chaudhuri, S. et al., "Including Group-By in Query Optimization, Proceedings of the 20th International Conference on Very Large Data Bases," 13 pages, Sep. 12-15, 1994.

* cited by examiner

*Primary Examiner* — Robert Timblin
(74) *Attorney, Agent, or Firm* — Hickman Palermo Truong Becker Bingham Wong LLP (57) ABSTRACT

Methods for transforming a query to remove redundant tables and eliminate superfluous join operations is provided. The methods provided transform queries to remove redundant tables and anti-joins, semi-joins, and outer-joins. Whether a table is redundant is determined based on a set of criteria which, if fulfilled, indicates that the removal of the table and the anti-join, semi-join, or outer-join operation does not impact query results. The removal of a redundant table from a query also results in the elimination of the anti-join, semi-join, or outer-join operation that references the removed table.

20 Claims, 5 Drawing Sheets employees 100

| empno | empname | deptno |
|---|---|---|
| 1 | John | 20 |
| 2 | Susan | 30 |
| 3 | Greg | 30 |
| 4 | Danielle | NULL | employees 100

| empno | empname | deptno |
|-------|---------|--------|
| 1 | John | 20 |
| 2 | Susan | 30 |
| 3 | Greg | 30 |
| 4 | Danielle | NULL |

FIG. 1 departments 200

| deptno | deptname |
|--------|----------|
| 10 | Engineering |
| 20 | Marketing |
| 30 | Legal |

| empname | deptno |
|---------|--------|
| Danielle | NULL |

400

FIG. 4 employees 500

| empno | empname | deptno |
|-------|---------|--------|
| 1 | John | 20 |
| 2 | Susan | 30 |
| 3 | Greg | 30 |
| 4 | Danielle | 40 |

FIG. 5

| empname | deptname |
|---------|----------|
| John | Marketing |
| Susan | Legal |
| Greg | Legal |
| Danielle | NULL |

| empname | deptno |
|---------|--------|
| John | 20 |
| Susan | 30 |
| Greg | 30 |
| Danielle | 40 |

TABLE ELIMINATION OPTIMIZATIONS

FIELD OF THE INVENTION

The present invention relates to database systems and, in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan optimized for efficient execution. The optimized execution plan may be based on a rewrite of the query.

In one type of inefficient queries, the queries contains logically unnecessary join operations which involve extraneous tables. This type of inefficient queries occur for many reasons. The first reason is that database users often do not write queries directly, but rather utilize "middleware" software programs. Such middleware software programs receive declarative input from the user and automatically generate queries based on the declarative input. Often, the "middleware" software does not check whether the code it generates contains unnecessary join operations. In addition, even a human application developer may introduce unnecessary joins that do not serve any logical purpose because he is not aware of the entirety of the intricacies of query optimization.

Unnecessary joins are undesirable because join operations are expensive operations for a database system to execute. Therefore, it is desirable to develop techniques for rewriting queries to eliminate tables from queries by removing join operations in the queries which contain the tables when such removals have no logical impact on the query results. Table elimination is also referred to as join elimination.

More specifically, there is a need for techniques and mechanisms for optimizing queries by recognizing unnecessary semi-joins, anti-joins, and outer-joins, to remove these unnecessary joins, and to thereby eliminate extraneous tables from database queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for detecting and eliminating unnecessary tables from queries by removing semi-join, anti-join, and outer-join operations involving the unnecessary tables from the queries.

Table Elimination for Queries Containing Semi-Join Operations

Consider the following two tables, employees and departments:

```
CREATE TABLE employees
(
    empno       NUMBER,
    empname     VARCHAR,
    deptno      NUMBER REFERENCES departments (deptno)
)
CREATE TABLE departments
(
    deptno      NUMBER PRIMARY KEY,
    deptname    VARCHAR
)
```

Table employees contains three columns: empno, empname, and deptno. Table departments contains two columns, deptno and deptname. A referential integrity constraint has been placed between the deptno column in employees and the deptno column in departments, where departments.deptno is the primary key and employees.deptno is the foreign key. In other words, the database enforces a consistency relationship between employees.deptno and departments.deptno such that employees.deptno can only contain values in departments.deptno (employees.deptno may still contain null values).

Figure 1:
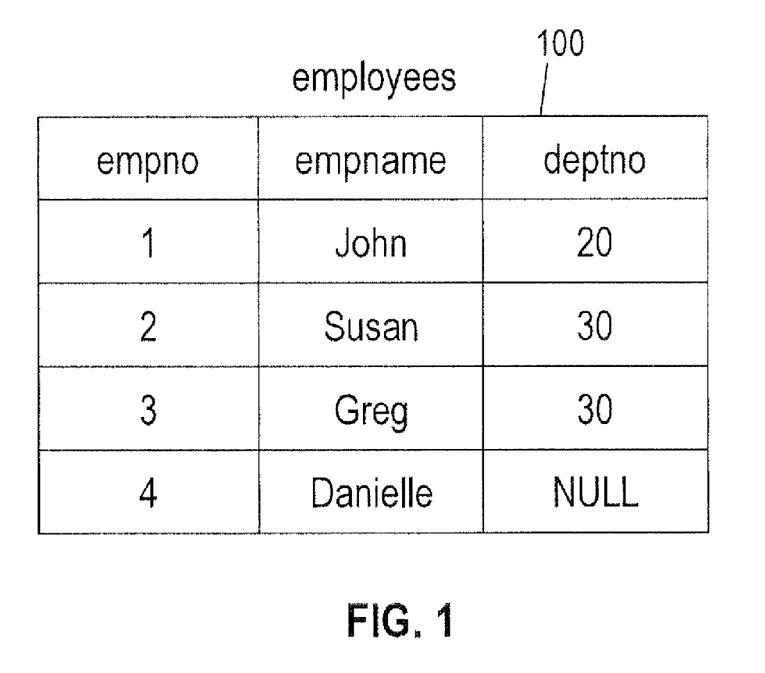
FIG. 1 depicts an example of a table containing employee information.
Figure 2:
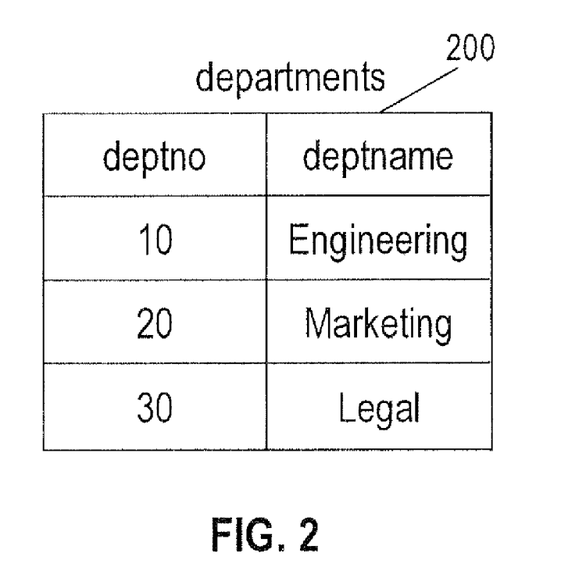
FIG. 2 depicts an example of a table containing department information.

FIG. 1 illustrates a table 100 which contains sample values consistent with the table definition for the employees table described above. FIG. 2 illustrates a table 200 which contains sample values consistent with the table definition for the departments table described above. The deptno column in table 200 contains three values: 10, 20, and 30. Consistent with the referential integrity constraint between employees.deptno and departments.deptno, the deptno column in table 100 contains non-null values 20 and 30. That is, the deptno column in table 100 does not contain any non-null values other than those in the deptno column of table 200. The deptno column in table 100, however, need not contain every single value in the deptno column in table 200. For example, the deptno column in table 100 does not contain the value 10, even though the deptno column in table 200 contains 10. The deptno column in table 100 can also contain null values. For example, table 100 contains a row where the empno column is 4, the empname column is Danielle, and the deptno column is null.

For a semi-join operation between a left table and a right table, the result of the semi-join operation is the set of all rows in the left table for which there is a row in the right table that satisfies the join predicate. The semi-join operator may not be an operator accessible to a SQL user. That is, a database user may not directly use a semi-join operation in writing a query. Rather, the semi-join operator may be used internally in the DBMS engine that is automatically generated as a result of the database unnesting a particular kind of subquery. Query Q1 below illustrates an example of a query which is usually unnested into code containing the semi-join operator:

```
Q1 =   SELECT employees.empname, employees.deptno
       FROM employees
       WHERE exists  (
                     SELECT 1
                     FROM departments
                     WHERE employees.deptno =
                           departments.deptno
                     )
```

Query Q1 requests the empname and deptno column values for all rows in the employees table whose deptno column equates with a value in the deptno column in the departments table. Therefore, Q1 can be unnested and rewritten as the following query Q1A, which contains a semi-join operator:

```
Q1A =  SELECT employees.empname, employees.deptno
       FROM employees
       WHERE employees.deptno S= departments.deptno
```

Figure 3:
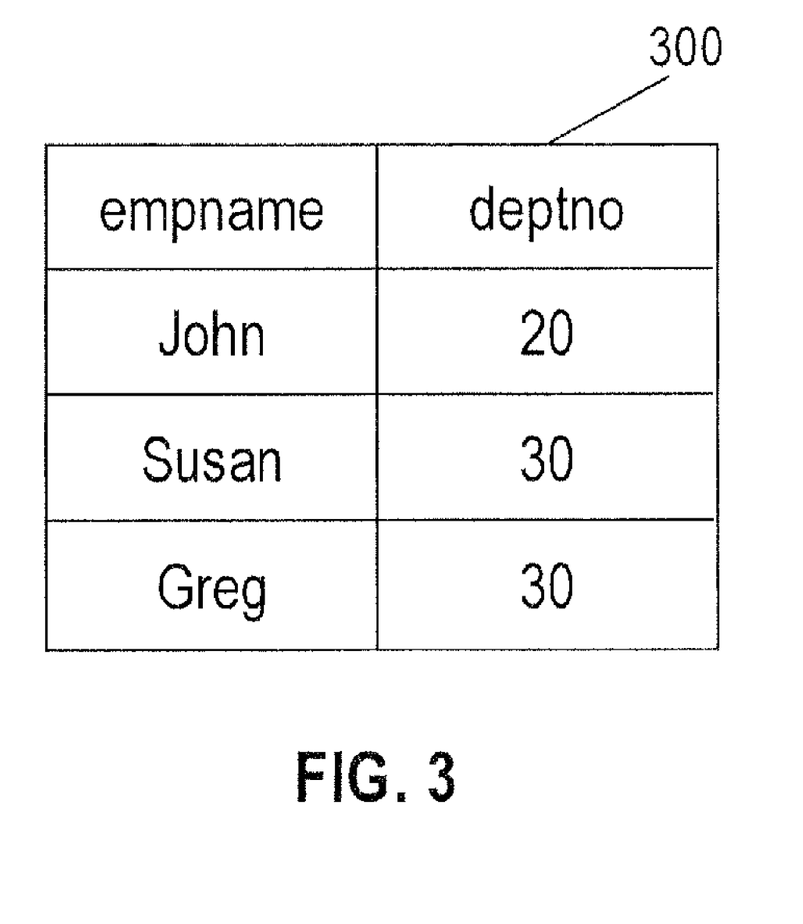
FIG. 3 depicts query results for a sample query containing a semi join.

In the query Q1A above, the notation "S=" denotes a semi-join operator. Therefore, Q1 effectively specifies a semi-join operation where the join predicate is "WHERE employees.deptno=departments.deptno". FIG. 3 illustrates query results 300 for Q1A, based on the sample values in tables 100 and 200. As query results 300 illustrate, the rows in table 100 containing John, Susan, and Greg in the empame column are returned as query results for Q1A because these rows contain values in the deptno column which are equal to a value in the deptno column of table 200. However, the row in table 100 that contains Danielle in the empname column is not part of query results 300 because that row contains in its deptno column a null value, which does not equal any value in the deptno column of table 200.

A query containing a semi-join operation, like query Q1 above, may be rewritten to eliminate the semi-join operation if certain constraints are satisfied. Specifically, an semi-join operation in query between a first table and a second table may be eliminated if: (1) the semi-join is an equijoin; (2) there is a referential integrity constraint between the join key of the first table and the join key of the second table, where the join key of the second table is the primary key and the join key of the first table is the foreign key; and (3) no column in the second table appears anywhere in the query apart from the join key in the join predicate. Significantly, since no column in the second table appears anywhere in the query apart from the join predicate of the semi join, removal of the semi join results in elimination of the second table from the query.

Q1 indeed satisfies the three conditions above. Therefore, Q1 can be rewritten as the following query Q1B:

```
Q1B =  SELECT employees.empname, employees.deptno
       FROM employees
       WHERE employees.deptno is not null
```

Q1B produces the same results as that produced by Q1B, which are the query results 300 in FIG. 3, because query Q1B satisfies the constraints set forth above. Q1B does not include a semi-join operation between a column of the employees table and a column of the departments table. In fact, Q1B does not involve the departments table at all. Therefore, by rewriting Q1 as Q1B, a table has been eliminated from the query, thereby significantly increasing the efficiency of processing the query Q1.

Finally, if the database schema contains a constraint that limits the deptno column in the employees table to contain only non-null values, then Q1B can be further reduced to Q1C below:

```
Q1C =  SELECT employees.empname, employees.deptno
       FROM employees
```

Table Elimination for Queries Containing Anti-Join Operations

For an anti-join operation between a left table and a right table, the result of the anti-join operation is the set of all rows in the left table for which there is no row in the right table that satisfies the join predicate. The anti-join operator may not be an operator accessible to a SQL user. That is, a SQL user may not directly use a anti-join operator in writing a query. Rather, the anti-join operator may be used internally in the DBMS engine that is automatically generated as a result of the database unnesting a particular kind of subquery. Query Q2 below illustrates an example of a query which is usually unnested into code containing an anti-join operator:

```
Q2 =   SELECT employees.empname, employees.deptno
       FROM employees
       WHERE not exists (
                     SELECT 1
                     FROM departments
                     WHERE employees.deptno =
                         departments.deptno
                     )
```

Query Q2 requests the empname and deptno column values for all rows in the employees table whose deptno column does not equate with any value in the deptno column in the departments table. Therefore, Q2 can be unnested and rewritten as the following query Q2A, which contains an anti-join operator:

```
Q2A =  SELECT employees.empname, employees.deptno
       FROM employees
       WHERE employees.deptno A= departments.deptno
```

Figure 4:
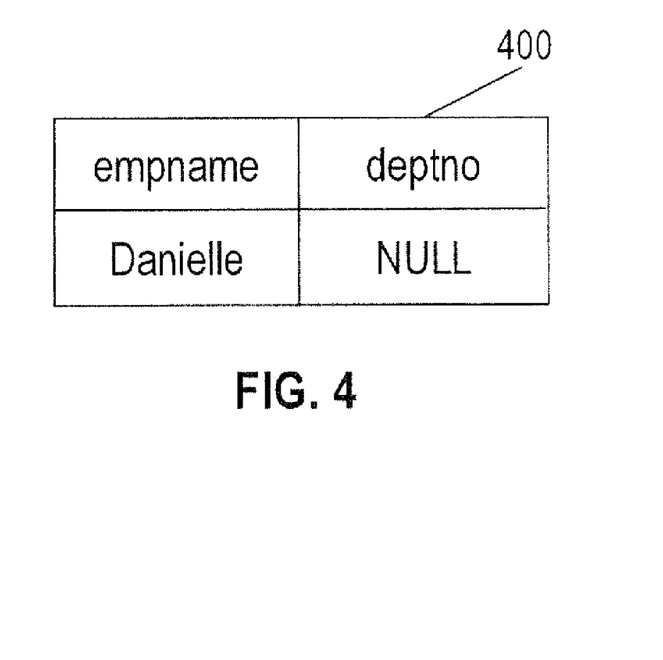
FIG. 4 depicts query results for a sample query containing an anti join.

In the query Q2A above, the notation "A=" denotes an anti-join operator. Therefore, Q2 effectively specifies an anti-join operation where the join predicate is "WHERE employees.deptno=departments.deptno". FIG. 4 illustrates query results 400 for Q2A, based on the sample values in tables 100 and 200. As query results 400 illustrates, the row in table 100 containing Danielle in the empame column is returned as the query result for Q2A because this row does not contain a deptno value which equates to any deptno value in table 200. The row containing Danielle in the empname column contains the null value in the deptno column, and the deptno column in table 200 does not contain any null values.

A query containing an anti-join operation, like query Q2 above, may be rewritten to eliminate the anti-join operation if certain constraints are satisfied. Specifically, an anti-join operation in a query between a first table and a second distinct table may be eliminated if: (1) the anti-join is an equijoin; (2) there is a referential integrity constraint between the join key of the first table and the join key of the second table, where the join key of the second table is the primary key and the join key of the first table is the foreign key; and (3) no column in the second table appears anywhere in the query apart from the join key in the join predicate. Significantly, since no column in the second table appears anywhere in the query apart from the join predicate of the anti join, removal of the anti join results in elimination of the second table from the query.

Q2 indeed satisfies the three conditions above. Therefore, Q2 can be rewritten as the following query Q2B:

```
Q2B =  SELECT employees.empname, employees.deptno
       FROM employees
       WHERE employees.deptno is null
```

Q2B produces the same results as that produced by Q2A which are the query result 400 in FIG. 4, because query Q2 satisfies the constraints set forth above. Q2B does not include an anti-join operation between a column of the employees table and a column of the departments table. In fact, Q2B does not involve the departments table at all. Therefore, by rewriting Q2 as Q2B, a table has been eliminated from the query, thereby significantly increasing the efficiency of processing the query Q2.

Finally, if the database schema contains a constraint that limits the deptno column in the employees table to contain only non-null values, then Q2B can be further reduced to Q2C below:

```
Q2C =  SELECT employees.empname, employees.deptno
       FROM employees
       WHERE (0 = 1)
```

If the database schema contains a constraint that limits the deptno column in the employees table to contain only non-null values, then query Q2A will not return any results. This is why query Q2C contains a false predicate (0=1).

Table Elimination for Queries Containing Outer-Join Operations

For an outer-join operation between a left table and a right table, the result of the outer-join operation is the set of all rows in the left table for which there is a row in the right table that satisfies the join predicate plus the set of all rows in the left table for which there is no row in the right table that satisfies the join predicate. Here, the right table is the outer-joined table. In the query results to an outer-join operation, some results may not have a value for every attribute queried. For these results, the attribute is filled in with a null-value.

For example, consider table employees2, defined below as:

```
CREATE TABLE employees2
(
    empno NUMBER,
    empname  VARCHAR,
    deptnoNUMBER REFERENCES departments (deptno)
)
```

Figure 5:
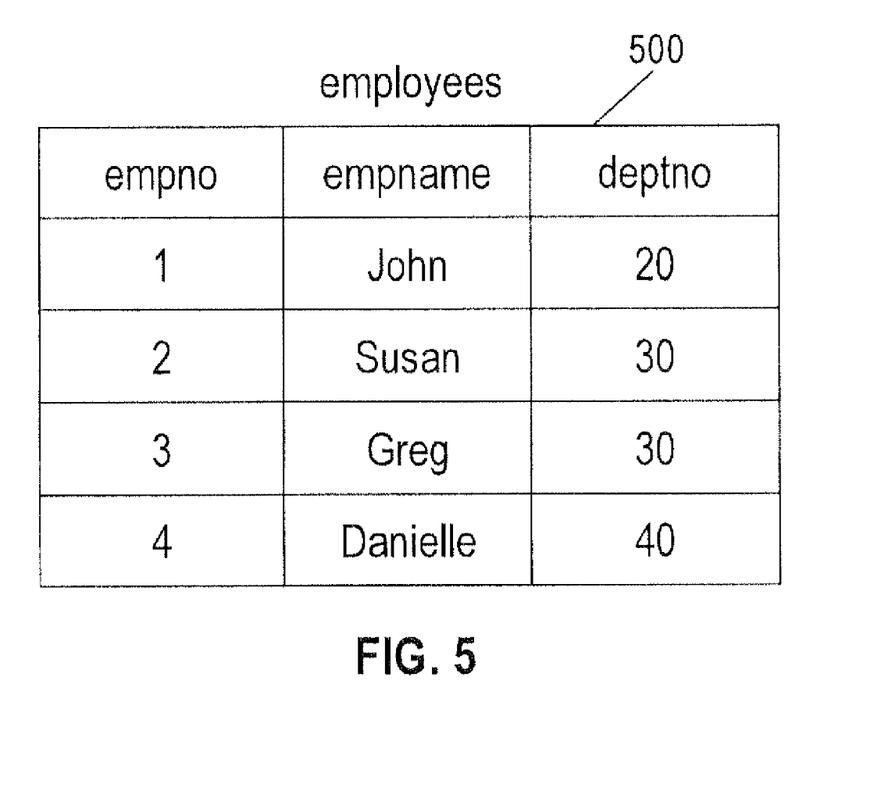
FIG. 5 depicts an example of another table containing employee information.

FIG. 5 illustrates a table 500 which contains sample values consistent with the table definition for the employees2 table described above. Table 500 is very similar to table 100 in FIG. 1. The notable difference between table 500 and table 100 is that for the row containing "Danielle" in the empname column, the deptno column in table 500 contains the value 40 while the deptno column in table 100 contains the null value. Q3 below illustrates a left outer-join between table 500 and table 200 in FIG. 2.

```
Q3 =  SELECT employees2.empname, departments.deptname
      FROM employees2, departments
      WHERE employees2.deptno = departments.deptno (+)
```

Figure 6:
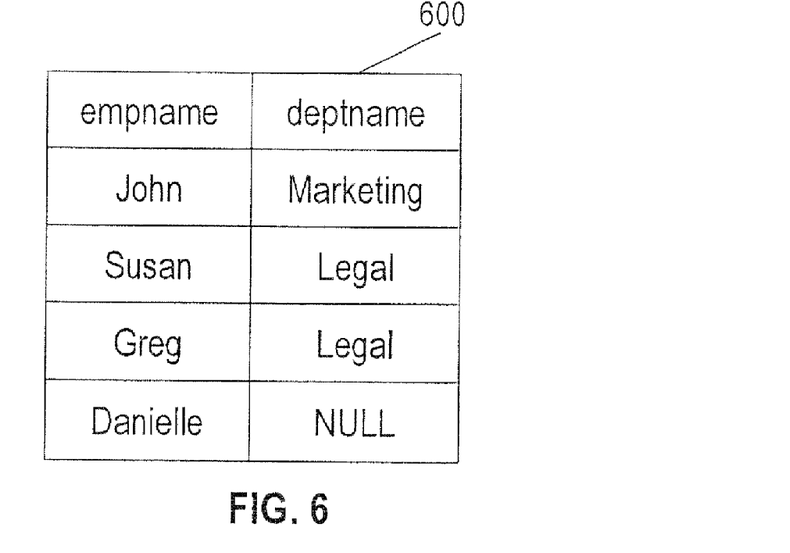
FIG. 6 depicts query results for a sample query containing an outer join.

The join predicate in the outer-join operation in query Q3 specifies all rows in the employees2 table (table 500) whose deptno column matches with a value in the deptno column in the departments table (table 200). In addition, by the definition of outer join, the join-predicate also specifies all rows in the employees2 table (table 500) whose deptno column does not match with a value in the deptno column in the departments table. Here, the departments table is the outer-joined table, as indicated by the "(+)" notation after "departments.deptno". The results for query Q3 is the list of the empname values in the employees2 table and the deptname values in the departments table for all the rows that satisfy the join predicate as described above. FIG. 6 illustrates query results 600, which are the query results for Q3 based on the sample values in tables 500 and 200.

Query results 600 can be derived as follows. In table 500, the rows which contain "John," "Susan," and "Greg" in the empname column also contain values in the deptno column, namely 20, 30, and 30, which correspond to values in the deptno column in the departments table. Therefore, the empname values of these rows are listed in query results 600. Furthermore, for each of these rows, the value in the deptname column of the row in table 200 which has a matching value in the deptno column is also listed. For example, the row containing "John" in the empname column contains the value 20 in the deptno column in table 500, and the row containing 20 in table 200 contains the value "Engineering" in the deptname column. Therefore, a tuple containing "John" and "Engineering" is listed in query results 600. For the same reason, query results 600 also contains a tuple containing "Susan" and "Legal" and a tuple containing "Greg" and "Legal".

However, the row in table 500 that contains "Danielle" in the empname column contains the value 40 in the deptno column. The value 40 is not contained in the deptno column of the departments table. Therefore, although "Danielle" is listed as part of query results 600 as required by the outer-join operation, the tuple containing "Danielle" has no corresponding value for the deptname attribute. Query results 600 show that in such a case, a fill value such as null may be returned in the query result.

In some cases, a query containing an outer-join operation may be rewritten to eliminate the outer-join operation if certain constraints are satisfied. Specifically, an outer-join operation in a query between a first table and a second table may be eliminated if: (1) the outer-join is an equijoin; (2) the join key in the outer joined table is unique; and (3) no column in the outer joined table appears anywhere in the query apart from the join key in the join predicate, with one exception that is explained in detail below. Significantly, since no column in the second table appears anywhere in the query apart from the join predicate of the outer join, removal of the outer join results in elimination of the second table from the query. In addition, while the join key column in the outer-joined table must be unique, there is no requirement of referential integrity constraint. This is advantageous because referential-integrity constraints can be defined only on a primary-key/foreign-key pair, and they are expensive to maintain.

Query Q4 below is another query that contains an outer-join operation.

```
Q4 = SELECT employees2.empname, employees2.deptno
     FROM employees2
     WHERE employees2.deptno = departments.deptno (+)
```

Figure 7:
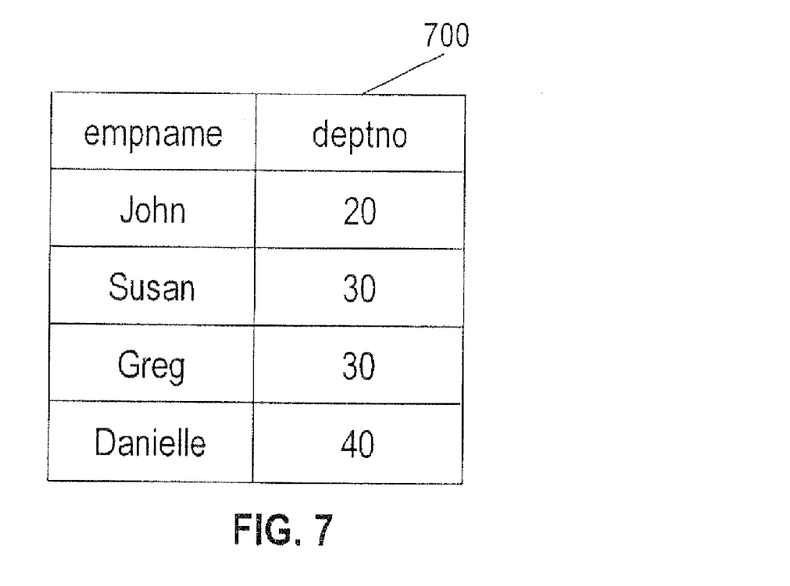
FIG. 7 depicts query results for another sample query containing an outer join.

FIG. 7 illustrates query results 700 for Q4, based on the sample values in tables 500 and 200. Query Q4 satisfies the conditions above for elimination of the outer joined table. Therefore, Q4 can be rewritten as the following query Q4A:

```
Q4A =   SELECT employees.empname, employees.deptno
        FROM employees
```

Q4A produces the same results as that produced by Q4, which are the query result 700 in FIG. 7, because query Q4A satisfies the constraints set forth above. Q4A does not include an outer-join operation between a column of the employees2 table and a column of the departments table. In fact, Q4A does not involve the departments table at all. Therefore, by rewriting Q4 as Q4A, a table has been eliminated from the query, thereby significantly increasing the efficiency of processing the query Q4A.

Exception. In the three conditions listed above for eliminating a table from a query containing an outer join, the third condition is that no column in the outer-joined table appears anywhere in the query apart from the join key in the join predicate, with one exception. The exception is that a column in the outer-joined table may appear in a filter that is applied before the join operation where a binary operator is applied to the column and where the other side of the expression is a constant. This is illustrated with query Q5 below.

```
Q5 = SELECT employees2.empname, employees2.deptno
     FROM employees2
     WHERE employees2.deptno = departments.deptno (+)
     AND departments.deptno(+) =< 20;
```

In query Q5, the use of the "(+)" sign next to the departments.deptno column in the filter predicate "departments.deptno(+)=<20" indicates that this filter is to be applied before the join. Query Q5 satisfies the conditions for table elimination for outer joins. More specifically, query Q5 contains the exceptional case. Therefore, although Q5 contains a column in the outer-joined table in a place other than the join predicate, Q5 can still be rewritten as query Q4A above. That is, query Q4A is logically equivalent to query Q5. This is because although query Q5 specifies the additional condition that an employees2 row be joined with a departments row only if the deptno column in the departments table is less than or equal to 20, the outer join definition instructs that rows in the departments table which contain deptno values greater than 20 also be included. Therefore, Q5 also produces the results 700 in FIG. 7

Hardware Overview

Figure 8:
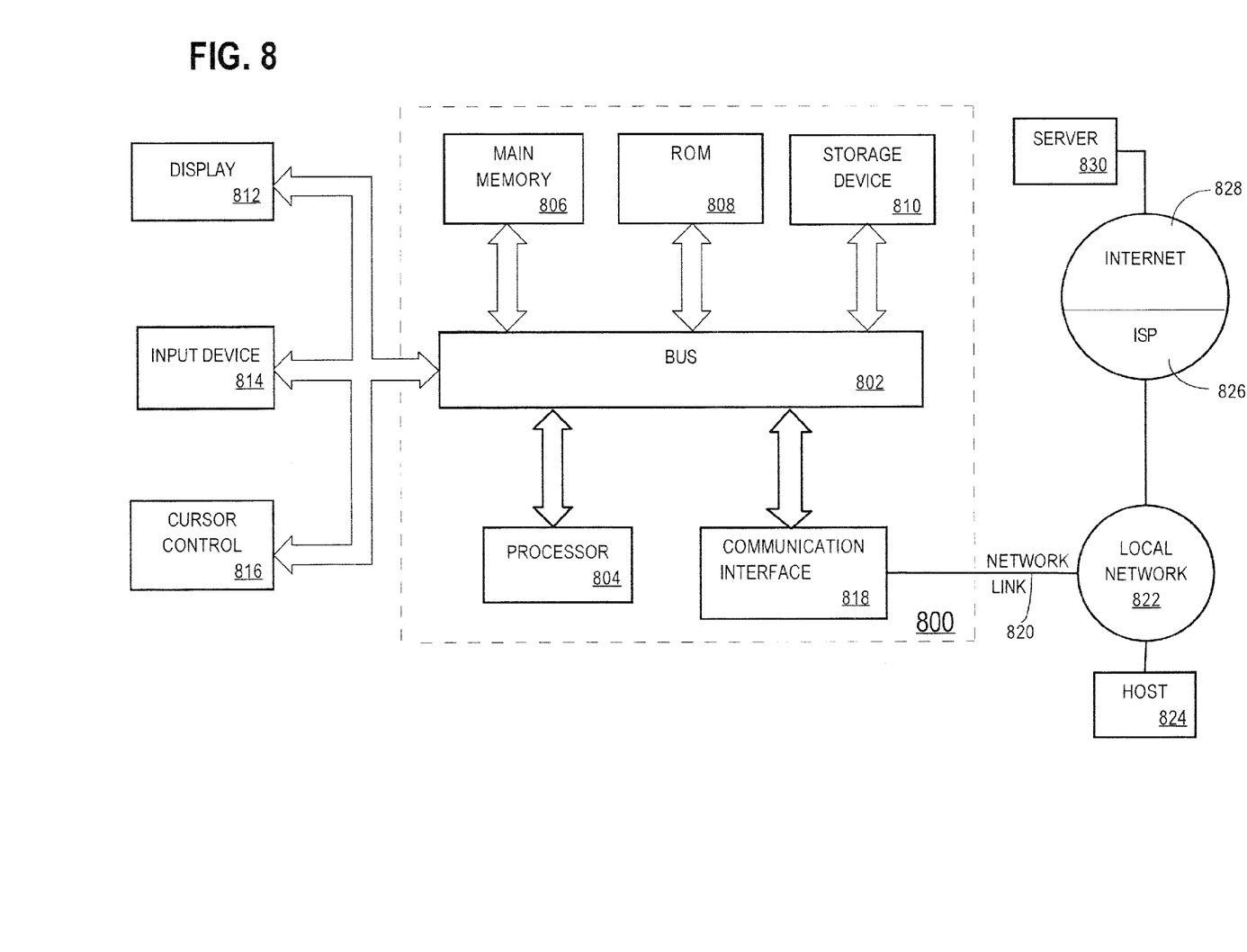
FIG. 8 depicts a computer system which may be used to implement an embodiment of the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage media storing instructions which, when executed by one or more processors, cause:

generating a transformed query based on a particular query that includes a join operation between a left table and a right table in response to determining that:
the particular query includes a predicate that returns rows from the left table based on a join predicate,
the join predicate specifies an equality between a joining column of the left table and a joining column of the right table,
the joining column of the left table has a referential integrity constraint on the joining column of the right table, and
no column of the right table is referenced in the particular query except in the join predicate of the particular query;
wherein said join operation is one of a semi-join operation or an anti-join operation;
wherein generating the transformed query includes the steps of:
if said join operation is a semi-join operation, then excluding the right table and the join predicate from the transformed query and including, in the transformed query, the left table and a transformed predicate that specifies that the joining column of the left table is not null, or
if said join operation is an anti-join operation, then excluding the right table and the join predicate from the transformed query and including, in the transformed query, the left table and (a) a transformed predicate that specifies that the joining column of the left table is null or (b) a transformed predicate that is a false condition.

2. The one or more computer-readable storage media of claim 1, wherein said join operation is a semi-join operation.

3. The one or more computer-readable storage media of claim 1, wherein said join operation is an anti-join operation.

4. The one or more computer-readable storage media of claim 3, wherein generating the transformed query includes:

determining whether a schema definition for the left table specifies that the joining column of the left table cannot contain null values;

if the schema definition for the left table specifies that the joining column of the left table cannot contain null values, then including, in the transformed query, the transformed predicate that is a false condition; and if the schema definition for the left table does not specify that the joining column of the left table cannot contain null values, then including, in the transformed query, the transformed predicate that specifies that the joining column of the left table is null.

5. The one or more computer-readable storage media of claim 2, wherein:

generating the transformed query includes determining whether a schema definition for the left table specifies that the joining column of the left table cannot contain null values; and including the transformed predicate in the transformed query is performed in response to determining that the schema definition for the left table does not specify that the joining column of the left table cannot contain null values.

6. One or more non-transitory computer-readable storage media storing instructions which, when executed by one or more processors, cause:

generating a transformed query based on a particular query that includes an outer-join operation between a left table and a right table in response to determining that:

the particular query includes a predicate that returns rows from the left table based on a join predicate, the join predicate specifies an equality between a joining column of the left table and a joining column of the right table, the joining column of the right table contains unique values, and no column of the right table is referenced in the particular query except in the join predicate of the particular query;

wherein generating the transformed query includes the steps of:

excluding the right table and the join predicate from the transformed query and including, in the transformed query, the left table and a transformed predicate that specifies that the joining column of the left table is not null.

7. The one or more computer-readable storage media of claim 6, wherein:

generating the transformed query includes determining whether a schema definition for the left table specifies that the joining column of the left table cannot contain null values; and including the transformed predicate in the transformed query is performed in response to determining that the schema definition for the left table does not specify that the joining column of the left table cannot contain null values.

8. The one or more computer readable storage media of claim 6, wherein the joining column of the left table does not have a referential integrity constraint on the joining column of the right table.

9. A computer-implemented method comprising the steps of:

generating a transformed query based on a particular query that includes an outer-join operation between a left table and a right table in response to determining that:

the particular query includes a predicate that returns rows from the left table based on a join predicate, the join predicate specifies an equality between a joining column of the left table and a joining column of the right table, the joining column of the right table contains unique values, and no column of the right table is referenced in the particular query except in the join predicate of the particular query;

wherein generating the transformed query includes the steps of:

excluding the right table and the join predicate from the transformed query and including, in the transformed query, the left table and a transformed predicate that specifies that the joining column of the left table is not null.

10. The method of claim 9, wherein:

generating the transformed query includes determining whether a schema definition for the left table specifies that the joining column of the left table cannot contain null values; and including the transformed query in the transformed predicate is performed in response to determining that the schema definition for the left table does not specify that the joining column of the left table cannot contain null values.

11. The method of claim 9, wherein the joining column of the left table does not have a referential integrity constraint on the joining column of the right table.

12. One or more non-transitory computer-readable storage media storing instructions which, when executed by one or more processors, cause:

generating a transformed query based on a particular query that includes an outer-join operation between a left table and a right table in response to determining that:

the particular query includes a predicate that returns rows from the left table based on a join predicate, the join predicate specifies an equality between a joining column of the left table and a joining column of the right table, the joining column of the right table contains unique values, and no column of the right table is referenced in the particular query except in a predicate that is applied before the outer-join operation, wherein the predicate comprises a binary relational operator, a column from the right table on one side of the binary relational operator, and a constant expression on another side of the binary relational operator;

wherein generating the transformed query includes excluding the right table and the join predicate from the transformed query.

13. The one or more computer readable storage media of claim 12, wherein the joining column of the left table does not have a referential integrity constraint on the joining column of the right table.

14. A computer-implemented method comprising the steps of:

generating a transformed query based on a particular query that includes an outer-join operation between a left table and a right table in response to determining that:

the particular query includes a predicate that returns rows from the left table based on a join predicate, the join predicate specifies an equality between a joining column of the left table and a joining column of the right table, the joining column of the right table contains unique values, and no column of the right table is referenced in the particular query except in a predicate that is applied before the outer-join operation, wherein the predicate comprises a binary relational operator, a column from the right table on one side of the binary relational operator, and a constant expression on another side of the binary relational operator;

wherein generating the transformed query includes excluding the right table and the join predicate from the transformed query.

15. The method of claim 14, wherein the joining column of the left table does not have a referential integrity constraint on the joining column of the right table.

16. A computer-implemented method comprising:
generating a transformed query based on a particular query that includes a join operation between a left table and a right table in response to determining that:
the particular query includes a predicate that returns rows from the left table based on a join predicate,
the join predicate specifies an equality between a joining column of the left table and a joining column of the right table,
the joining column of the left table has a referential integrity constraint on the joining column of the right table, and
no column of the right table is referenced in the particular query except in the join predicate of the particular query;
wherein said join operation is one of a semi-join operation or an anti-join operation;
wherein generating the transformed query includes the steps of:
if said join operation is a semi-join operation, then excluding the right table and the join predicate from the transformed query and including, in the transformed query, a transformed predicate that specifies that the joining column of the left table is not null, or
if said join operation is an anti-join operation, then excluding the right table and the join predicate from the transformed query and including, in the transformed query, the left table and (a) a transformed predicate that specifies that the joining column of the left table is null or (b) a transformed predicate that is a false condition.

17. The method of claim 16, wherein said join operation is an anti-join operation.

18. The method of claim 17, wherein generating the transformed query includes:
determining whether a schema definition for the left table specifies that the joining column of the left table cannot contain null values;
if the schema definition for the left table specifies that the joining column of the left table cannot contain null values, then including, in the transformed query, the transformed predicate that is a false condition; and
if the schema definition for the left table does not specify that the joining column of the left table cannot contain null values, then including, in the transformed query, the transformed predicate that specifies that the joining column of the left table is null.

19. The method of claim 16, wherein said join operation is a semi-join operation.

20. The method of claim 19, wherein:
generating the transformed query includes determining whether a schema definition for the left table specifies that the joining column of the left table cannot contain null values; and
including the transformed predicate in the transformed query is performed in response to determining that the schema definition for the left table does not specify that the joining column of the left table cannot contain null values.

* * * * *

UNITED STATES PATENT AND TRADEMARK OFFICE
CERTIFICATE OF CORRECTION

| | | |
|---|---|---|
| PATENT NO. | : 8,352,461 B2 | Page 1 of 1 |
| APPLICATION NO. | : 11/854526 | |
| DATED | : January 8, 2013 | |
| INVENTOR(S) | : Ahmed et al. | |

It is certified that error appears in the above-identified patent and that said Letters Patent is hereby corrected as shown below:

Title page, column 2, under other publication, insert
-- U.S. Appl. No. 11/842,865, filed Aug 21, 2007, Notice of Allowance, Apr 9, 2012. --.

In the Specifications:

In column 6, line 15, delete "deptnoNUMBER" and insert -- deptno NUMBER --, therefor.

In column 8, line 16, after "FIG. 7" insert -- . --.

Signed and Sealed this
Twenty-first Day of May, 2013

Teresa Stanek Rea
*Acting Director of the United States Patent and Trademark Office*